United States Patent
Oren et al.

(10) Patent No.: US 6,353,216 B1
(45) Date of Patent: Mar. 5, 2002

(54) CONFOCAL MEASUREMENT AND DIAGNOSTIC SYSTEM

(75) Inventors: Ilan Ben Oren, Jerusalem; Serge Steinblatt, Ra'anana, both of (IL)

(73) Assignee: CreoScitex Corporation Ltd., Herzlia (IL)

( * ) Notice: Subject to any disclaimer, the term of this patent is extended or adjusted under 35 U.S.C. 154(b) by 0 days.

(21) Appl. No.: 08/843,570

(22) Filed: Apr. 18, 1997

(30) Foreign Application Priority Data

Apr. 25, 1996 (IL) .................................................. 118030

(51) Int. Cl.$^7$ ................................................ G02B 7/04
(52) U.S. Cl. ................................ 250/201.3; 250/201.4; 359/368
(58) Field of Search ........................... 250/201.3, 201.2, 250/201.4; 359/368

(56) References Cited

U.S. PATENT DOCUMENTS

| | | | | |
|---|---|---|---|---|
| 4,342,905 A | * | 8/1982 | Fujii et al. | 250/201 |
| 4,844,617 A | * | 7/1989 | Kelderman et al. | 356/372 |
| 5,161,052 A | * | 11/1992 | Hill | 359/377 |
| 5,249,030 A | | 9/1993 | Field et al. | 356/487 |
| 5,483,055 A | * | 1/1996 | Thompson et al. | 250/201.3 |
| 5,488,230 A | | 1/1996 | Mizutani et al. | 250/548 |
| 5,489,986 A | | 2/1996 | Magomet et al. | 356/401 |
| 5,537,247 A | * | 7/1996 | Xiao | 359/368 |
| 5,543,918 A | * | 8/1996 | Abraham et al. | 356/376 |
| 5,731,588 A | * | 3/1998 | Hell et al. | 250/458.1 |
| 5,785,651 A | * | 7/1998 | Kuhn et al. | 600/310 |

* cited by examiner

*Primary Examiner*—Edward P. Westin
*Assistant Examiner*—Que T. Le
(74) *Attorney, Agent, or Firm*—Eitan, Pearl, Latzer & Cohen-Zedek

(57) ABSTRACT

A confocal optical system is disclosed that utilizes fiber optic components in its construction. The system includes a light source, two detection units, an aperture and an optical element all optically coupled to a fiber optic coupler via optical fibers. In addition, a novel automatic focusing device is disclosed which utilizes chromatic aberration to maintain a target object in optimal focus. The device includes two light sources having different wavelengths of light, an optical element, an aperture, two detection units and a beam splitter. One light source is used to achieve initial focus and to illuminate the target object. The second light source is used to maintain the target object in optical focus. Light reflected off the target object is measured by one of the detection units. The magnitude of the light of the second wavelength measured by the detection unit is utilized to maintain focus. A second detection units is utilized to measure the intensities of the two light sources to yield normalized results. Further, a method of diagnosing an optical system is also disclosed. The method includes comparing a current set of readings of light against a set of reference readings taken at an earlier point in time. If the difference exceeds a predetermined threshold, a problem is indicated.

3 Claims, 13 Drawing Sheets

CONFOCAL MEASUREMENT AND DIAGNOSTIC SYSTEM

FIELD OF THE INVENTION

The present invention relates to electro-optics and more particularly to confocal measuring using two wavelengths of light to determine the optimal position and displacement of a movable object.

BACKGROUND OF THE INVENTION

Typically, in order to determine the position of an object, an optical fiber cable connects a light-source and a light detector to a sensor. An optical signal generated by the source is transmitted through the cable to the sensor. The sensor, in response to a physical variable that is desired to be measured, such as displacement, modulates a characteristic of the optical signal in accordance with changes in the physical variable. The modulated signal is thereafter transmitted to the detector which converts that signal to a useful output representative of the magnitude of the physical variable.

It is known to utilize a portion of the modulated signal as a feedback control signal for insuring a constant level output from the light-source. However, this device still does not overcome the problems that may arise from instabilities in the light detectors or in the optical cables. Generally, the modulated signal is divided and transmitted simultaneously through at least two optical cables to respective measurement detectors coupled to each cable. This arrangement requires that these two (or more) optical cables have matching optical properties and performances, so that accurate measurements can be derived from the modulated signal produced by the sensor. The use of multiple parallel routes will increase the sources of drift caused because of instabilities and changes in the operation of the light-source or detector.

With a conventional microscope, the image is blurred when not in focus. In contrast, with a confocal microscope, an object which is not in focus appears very dim and blurred with minimal contrast. Thus, using a confocal microscope, a strong output is only produced when the object is in focus. Confocal microscopes are well known in the art. It is also known in the art to use single-mode optical fibers in confocal microscopes and to use the same fiber for transmitting and detecting the reflected confocal signal. An example is described by R. Juskaitis and T. Wilson in their article entitled 'Direct-View Fiber-Optic Confocal Microscope,' published in *Optics Letters,* Volume 19, Number 22, November 1994. R. H. Webb and F. J. Rogomentich in their article entitled 'Microlaser Microscope using Self-Detection for Confocality,' published in *Optics Letters,* Volume 20, Number 6, March 1995, describe a scanning confocal microscope using its own source lasers as detectors and a beam splitter and a single avalanche photodiode (APD) to detect the reflected light.

Reference is now made to FIG. 1, which illustrates a prior art confocal scanning unit, generally designated 10, for maintaining a target object 12 in focus. The prior art confocal device 10 is operative to move either the optical head mechanism or the object 12 in the z-plane in order to maintain the object in focus. The confocal scanning unit 10 comprises a radiation source 14, a first lens system 16 and a second lens system 18. Confocal scanning unit 10 further comprises a beam splitter 20 and a third lens system 22.

Rays 24a and 24b travel from radiation source 14 via first lens system 16 and second lens system 18 to object 12. Rays 24a and 24b are then reflected as rays 26a and 26b, respectively, via second lens system 18, beam splitter 20 and third lens system 22 to a detection unit 28 via an aperture 25.

The detected signal strength as a function of the axial displacement between the optical assembly and the target object using the prior art confocal measuring device of FIG. 1 is graphically illustrated in FIG. 2. The amplitude of the detected signal (y-axis) as a function of the axial displacement (x-axis) is shown as the object is scanned into and out of focus. In this example, the signal 30 shows an axial response having a full width half maximum (FWHM) of approximately 3 $\mu$m. If the object is not in focus, the reflected signal will be less than the signal associated with the zero displacement line 32. However, a major disadvantage with this system is that when reading the signal value while the unit is not in focus, it is not possible to determine the direction of the offset of the object, i.e., whether it is closer or farther away from the zero displacement line 32.

Dutch Patent No. NL 9001202 assigned to Phillips N V describes a confocal scanning unit using a single source of radiation together with a beam splitter. This unit uses additional lens and/or beam splitters and/or detectors to determine the displacement of the scanned unit. Such a unit is bulky, complicated and expensive to produce.

It is also known to use two wavelengths of light to determine the position of a movable element. U.S. Pat. No. 4,596,925, issued to Gilby, describes a fiber optic displacement sensor, which transmits two different wavelengths via an optical fiber to a filter. The filter and the movable element of the sensor cooperate with each other to modulate the intensity of the first beam in accordance with the position of the movable element thereby transforming the first beam into a measurement beam. The second beam and its resulting reference beam are used to compensate for the effects that the optical paths have on the intensities of the first beam and its resulting measurement beam.

U.S. Pat. No. 4,946,275, issued to Bartholomew, describes a distance measurement system for monitoring changes in distances between a source of illumination and a reflective surface. A collimated beam of light from a white light source passes through a grating to split the beam into a spectrum which is directed to the reflective surface at an unknown distance therefrom. The dispersed light bounced off the reflective surface enters a receiver fiber optic device connected to a detector for determining the distance between the grating and the reflective surface.

U.S. Pat. No. 5,196,866, issued to Ferschl et al., teaches an imaging apparatus utilizing a rotating carrier member having a plurality of laser diodes and a plurality of optical fibers connecting the laser diodes to a movable writing head. A focusing arrangement is provided for focusing the writing beam with respect to the writing element and comprises a laser diode for generating a focusing beam of light projected onto the writing element and a photocell. The focusing beam and writing beams are physically separated at the writing head.

U.S. Pat. No. 5,257,038, issued to Ferschl et al., teaches a focusing device for focusing a light source which generates a first beam of light of a wavelength selected to be actinic with respect to the writing element. The focusing device includes a focusing laser diode mounted on and movable with a movable write head to minimize noise in the focusing signal.

None of the above mentioned prior art references which use two wavelengths or white light can be used for finding the optimal position of an object.

SUMMARY OF THE PRESENT INVENTION

The present invention is a confocal optical system that utilizes fiber optic components in its construction. The system comprises a light source, two detection units, an aperture and an optical element all optically coupled to a fiber optic coupler via optical fibers. In addition, the present invention also comprises a novel automatic focusing device which utilizes chromatic aberration to maintain a target object in optimal focus. The device comprises two light sources having different wavelengths of light, an optical element, an aperture, two detection units and a beam splitter. One light source is used to achieve initial focus and to illuminate the target object. The second light source is used to maintain the target object in optical focus. Light reflected off the target object is measured by one of the detection units. The magnitude of the light of the second wavelength measured by the detection unit is utilized to maintain focus. A second detection unit is utilized to measure the intensities of the two light sources to yield normalized results. Further, the present invention also comprises a method of diagnosing an optical system. The method comprises comparing a current set of readings of light against a set of reference readings taken at an earlier point in time. If the difference exceeds a predetermined threshold, a problem is indicated.

The present invention utilizes the novel technique of accurately determining the displacement of an object utilizing chromatic aberration. Chromatic aberration causes the lens to focus different colors of light at different points. That is, two light sources having different wavelengths, but located at substantially the same point, have images in different planes. Thus, by using two different light sources within an automatic focusing device to scan an object, it is possible to determine whether the scanned object is in focus and furthermore, the direction in which the object is out of focus, i.e., nearer or farther away.

One advantage of using such a technique is that the same channel can incorporate both the beam used for the actual writing of data onto the media and the beam used for focusing. For example, even when the writing beam is off, the focus beam can be maintained. A second advantage is that the detected signals give an indication of in what direction to move in order to correct the out of focus condition. This is in contrast with typical confocal systems which do not have such an automatic focus mechanism.

There is therefore provided in accordance with the present invention a confocal optical device illuminating a target object, comprising a light source for generating a beam of light, an optical element for illuminating the target object, a first detection unit for measuring the magnitude of light reflected off the target object, the magnitude of light being related to the focal position of the target object, an optical coupler optically coupled to the light source, the optical element and the first detection unit, an aperture operatively situated such that the reflected light causes a maximum signal to be generated by the first detection unit when the target object is in focus, optical connection means for optically connecting the light source, the first detection unit and the optical element to the optical coupler, and wherein a maximum signal measured by the first detection unit indicates that the target object is in proper focus.

The optical device further comprises a second detection unit for measuring the intensity of the light source, the second detection unit optically connected to the optical coupler, the intensity of the light source utilized to normalize the magnitude measured by the first detection unit in determining the proper focus distance for the target object. The optical connection means comprises a plurality of optical fibers.

Further, there is provided in accordance with the present invention an automatic focusing device for maintaining a target object at an optimum focal distance, comprising a first light source for generating a beam of light having a first wavelength, a second light source for generating a beam of light having a second wavelength, an optical element for illuminating the target object, a first detection unit for measuring the magnitude of light of the first wavelength reflected off the target object, the first detection unit for measuring the magnitude of light of the second wavelength reflected off the target object, both magnitudes of light being related to the focal position of the target object, an aperture operatively situated such that light of the first wavelength causes a maximum signal to be generated by the first detection unit when the target object is in focus, a beam splitter for coupling light from the first and second light sources to the target object, the beam splitter coupling light from the target object to the first detection unit, wherein the magnitude of light of the second wavelength as measured by the first detection unit is related to the focal distance of the target object, and wherein the direction of the swing of the magnitude of light of the second wavelength is indicative of the direction of misfocus of the target object.

The optical device further comprises a second detection unit for measuring the intensity of the first light source, the beam splitter coupling light from the first light source to the second detection unit, the intensity of the first light source utilized to normalize the magnitude of light of the first wavelength measured by the first detection unit in determining the proper focus distance for the target object.

The optical device further comprises a second detection unit for measuring the intensity of the second light source, the beam splitter coupling light from the second light source to the second detection unit, the intensity of the second light source utilized to normalize the magnitude of light of the second wavelength measured by the first detection unit in determining the proper focus distance for the target object. The optical element comprises at least one lens.

In addition, the first detection unit comprises a spectrally sensitive beam splitter for splitting light in accordance with its wavelength, a first detector for sensing a magnitude of light of the first wavelength, and a second detector for sensing a magnitude of light of the second wavelength.

Also, there is provided in accordance with the present invention an automatic focusing device for maintaining a target object at an optimum focal distance, comprising a first light source for generating a beam of light having a first wavelength, a second light source for generating a beam of light having a second wavelength, an optical element for illuminating the target object, a first detection unit for measuring the magnitude of light of the first wavelength reflected off the target object, the first detection unit for measuring the magnitude of light of the second wavelength reflected off the target object, both magnitudes of light being related to the focal position of the target object, an aperture operatively situated such that light of the first wavelength causes a maximum signal to be generated by the first detection unit when the target object is in focus, optical coupling means optically coupled to the first light source, the second light source, the optical element and the first detection unit, optical connection means for optically connecting the first light source, the second light source, the first detection unit and the optical element to the optical coupling means, wherein the magnitude of light of the second wavelength as measured by the first detection unit is related to the focal distance of the target object, and wherein the direction of the swing of the magnitude of light of the second wavelength is indicative of the direction of misfocus of the target object.

The optical device further comprises a second detection unit for measuring the intensity of the first light source, the beam splitter coupling light from the first light source to the second detection unit, the intensity of the first light source utilized to normalize the magnitude of light of the first wavelength measured by the first detection unit in determining the proper focus distance for the target object.

The optical device further comprises a second detection unit for measuring the intensity of the second light source, the beam splitter coupling light from the first second light source to the second detection unit, the intensity of the second light source utilized to normalize the magnitude of light of the second wavelength measured by the first detection unit in determining the proper focus distance for the target object.

The optical coupling means comprises at least one fiber optic coupler. The first detection unit comprises a spectrally sensitive beam splitter for splitting light in accordance with its wavelength, a first detector for sensing a magnitude of light of the first wavelength, and a second detector for sensing a magnitude of light of the second wavelength.

Still further, there is provided in accordance with the present invention, in an automatic focus system having a first light source of a first wavelength, a second light source of a second wavelength, a method of achieving optical focus distance for a target object, the method comprising the steps of illuminating the target object with the first light source, stepping through a focusing range for the optical system, determining the maximum signal of a light beam of the first wavelength reflected off the target object for the entire focusing range, the maximum signal representing optical focal distance for the target object, storing the maximum signal, illuminating the target object with the second light source, measuring a signal $D_3$ of a light beam of the second wavelength reflected off the target object, the signal $D_3$ representing optical focal distance for the target object, measuring, on a substantially continuous basis, a signal $D_4$ of a light beam of the second wavelength reflected off the target object, calculating the difference $\Delta D_2 = D_4 - D_3$, and adjusting the focal distance to the target object in accordance with the sign and magnitude of $\Delta D_2$.

The method further comprises the steps of measuring a signal $S_2$ corresponding to the intensity of the second light source, and normalizing the signals $D_4$ and $D_3$ utilizing the signal $S_2$ before the step of calculating.

There is also provided in accordance with the present invention, in an optical system for illuminating a target object and having a light source, a method for performing diagnostics on the optical system, the method comprising the steps of stepping through a focusing range for the optical system, determining a maximum magnitude D of the light reflected off the target object for the entire focusing range, measuring the intensity S of the light source, at a later time: stepping through a focusing range for the optical system, determining a maximum magnitude D' of the light reflected off the target object for the entire focusing range, measuring the intensity S' of the light source, calculating the quantity $$\left| \frac{D}{S} - \frac{D'}{S'} \right|,$$

and indicating to the system that a problem exists if the quantity exceeds a predetermined threshold.

BRIEF DESCRIPTION OF THE DRAWINGS

The present invention will be understood and appreciated more fully from the following detailed description taken in conjunction with the drawings in which.

DETAILED DESCRIPTION OF THE INVENTION

Figure 1:
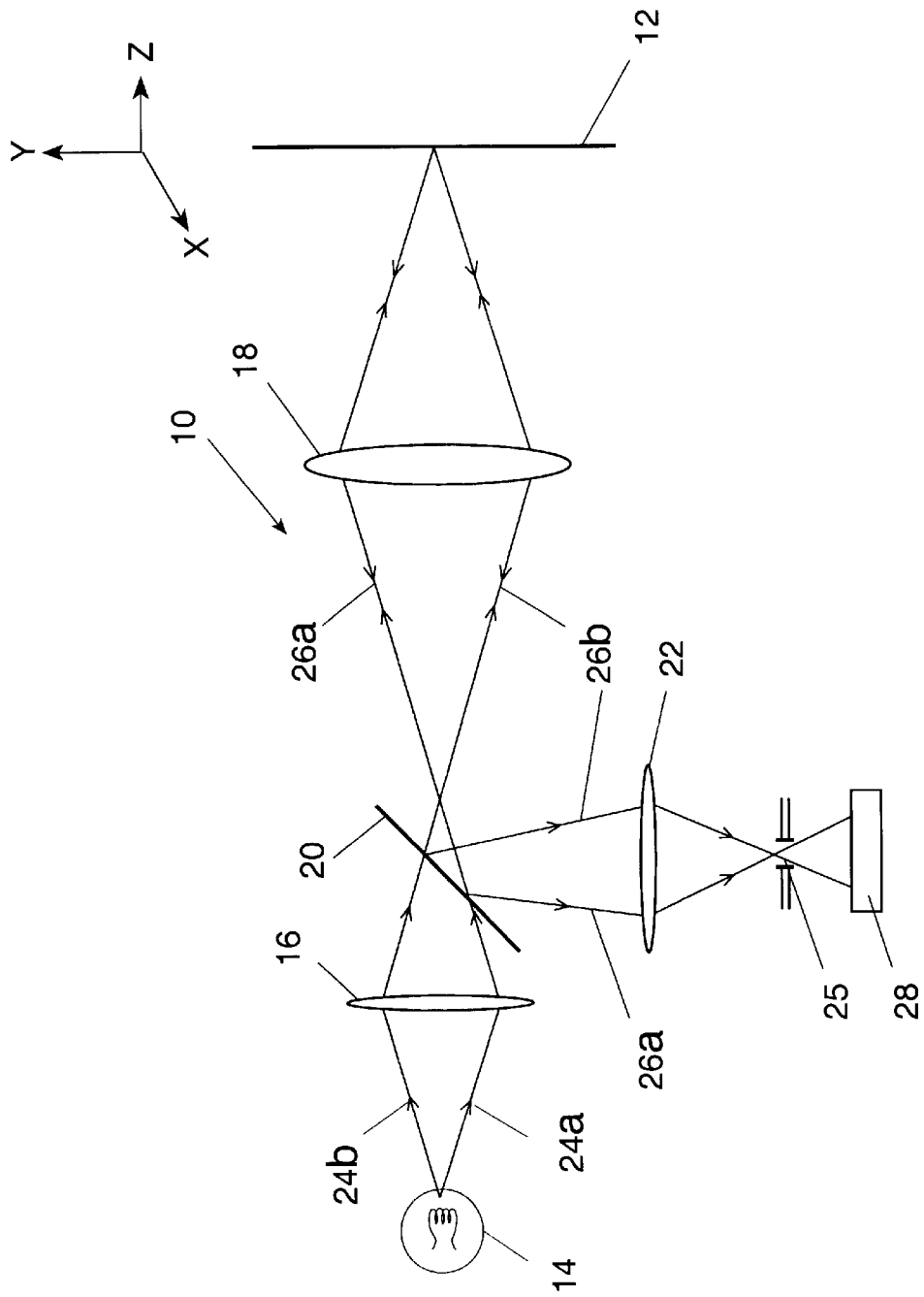
FIG. 1 is a high level schematic diagram illustrating a prior art confocal optical measuring device.
Figure 2:
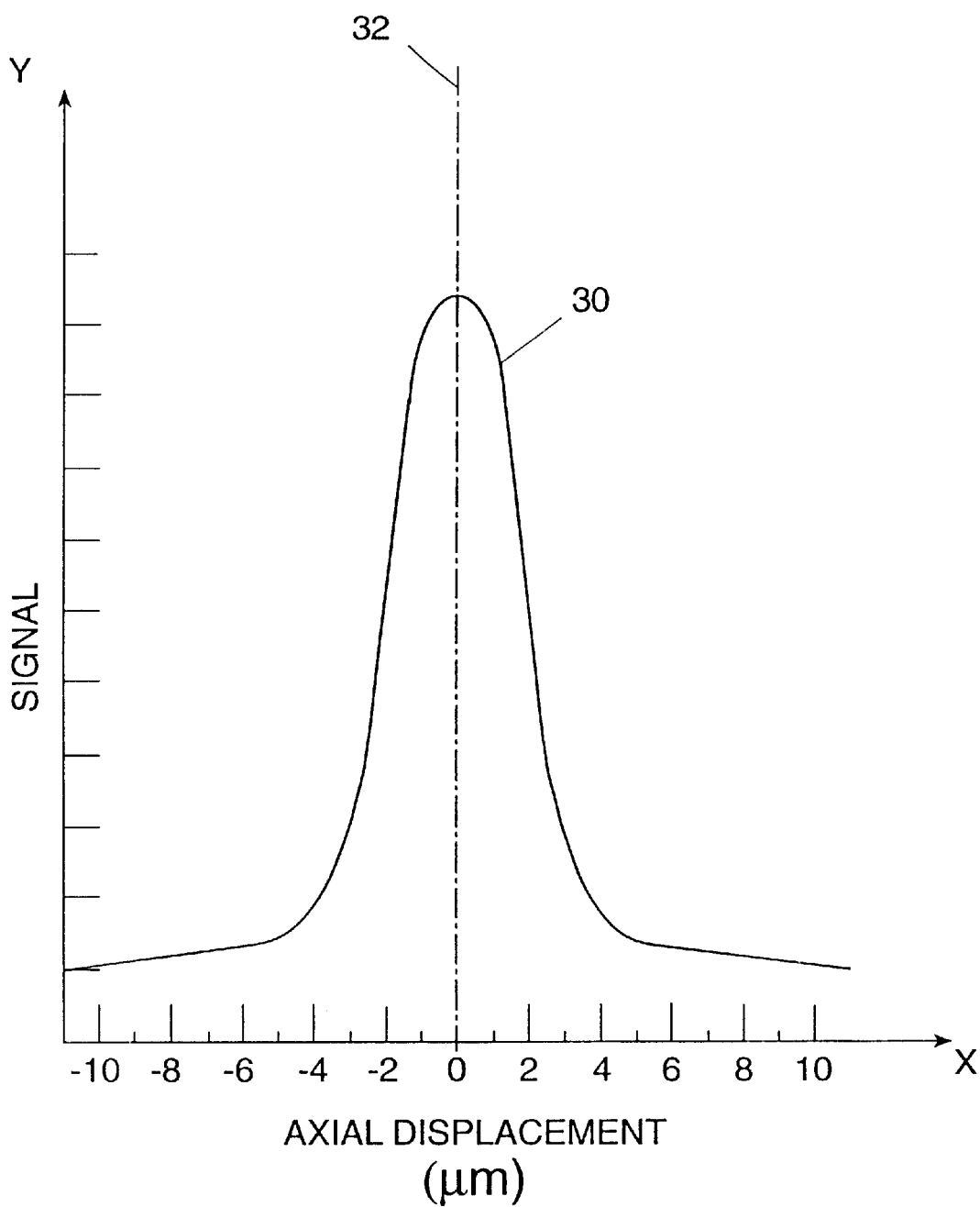
FIG. 2 graphically illustrates the detected signal strength as a function of the axial displacement between the optical assembly and the target object using the prior art confocal measuring device of FIG. 1.
Figure 3:
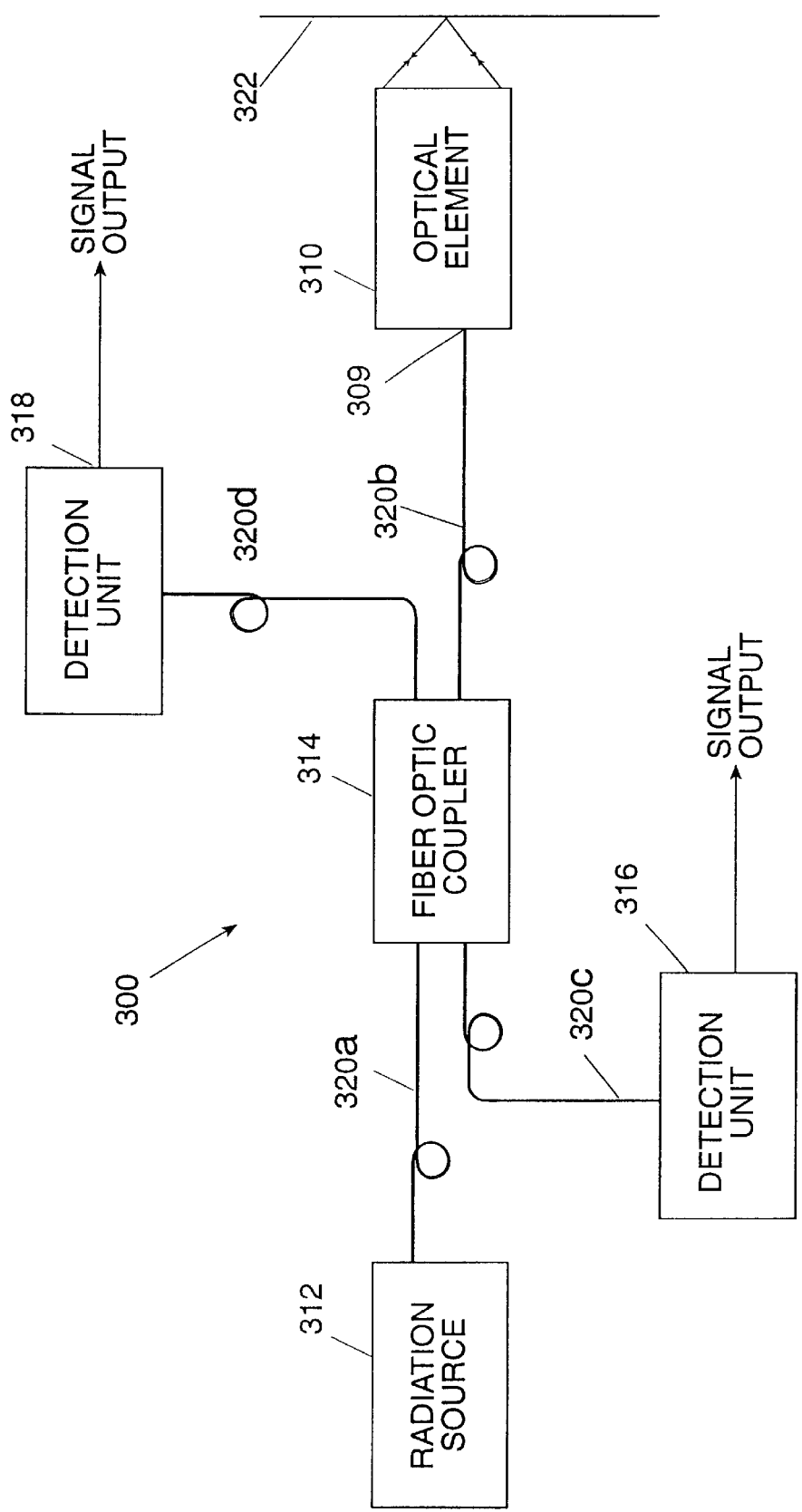
FIG. 3 is a high level block diagram illustrating a confocal measuring device constructed in accordance with a first embodiment of the present invention.

A high level block diagram illustrating a confocal optical measuring device, generally referenced 300, constructed in accordance with a first embodiment of the present invention is shown in FIG. 3. Confocal device 300 comprises an optical element 310, a radiation source 312, a fiber optic coupler 314 and a first detection unit 316. Fiber optic coupler 314 is connected to the radiation source 312 via optical fiber 320a, to first detection unit 316 via optical fiber 320c, to the optical element 310 via optical fiber 320b and to the detection unit 318 via optical fiber 320d.

Radiation source 312 is directed via fiber optic coupler 314 to the optical element 310, which illuminates the target object 322. The reflected signal is directed by the fiber optic coupler 314 to the first detection unit 316.

The optical element 310 comprises a lens assembly which may comprise one or more optical lenses. The end portion 309 of the optical fiber 320b, proximate to the optical element 310, serves as a source of illumination and also as an aperture.

The radiation source 312 may be any light source suitable for use with optical fiber, such as a laser light source.

The confocal device 300 may be used with light having a single wavelength along with fiber optic coupler 314 to set up and maintain the unit in focus, using a technique described in more detail below.

To set up the confocal device 300, the target object 322 to be illuminated is placed in position and a beam having a wavelength $\lambda_1$ is activated from radiation source 312. The beam is directed via optical fiber 320a, through directional fiber optic coupler 314, onto optical fiber 320b, to the optical element 310 and ultimately illuminates the target object 322. A portion of the light hitting the object is reflected back into the optical element 310 and is directed along optical fiber 320b to directional coupler 314. The beam is then directed to first detection unit 316, via fiber 320c, where the signal strength of the reflected optical beam is measured. The signal output of the detection unit 316 is proportional to the axial displacement of the object in the z-axis. Based on the signal output from the detection unit 316, the position of the object 322 in the z-axis can be adjusted. The object 322 is continuously moved until the signal output from the detection unit 316 is a maximum. The maximum signal indicates that the object is in focus.

Once the object is in focus, the object 322 is continuously illuminated and the signal representing the magnitude of the reflected light beam is compared with the maximum signal to check that the object remains in focus. However, the light intensity output of the radiation source may not remain constant over time. Thus, rather than compare the measured reflected light intensity with the absolute maximum previously recorded at the beginning of the process, a relative reflected light intensity is compared with a relative maximum value. The relative maximum quantity is derived by dividing the recorded maximum light intensity (i.e., reflecting optimum focus) by a current reading of the intensity of the radiation source 312. Likewise, the relative measured reflected light intensity from the object is derived by dividing the measured value by the current reading of the radiation source 312.

Current readings of the radiation source 312 are obtained from a second detection unit 318 optically connected to fiber optic coupler 314. The second detection unit 318, which is similar to first detection unit 316, is used for calibration purposes to measure the laser intensity of the optical light beam from radiation source 312 after it passes through fiber optic coupler 314.

For example, if the radiation source 312 loses some of its intensity, the signal measured by the second detection unit 318 will be reduced. The loss of radiation source intensity will also result in a reflected signal having reduced intensity as measured by the first detection unit 316. However, since relative readings are used, the drop in intensity of the radiation source does not interfere with the operation of the device. Thus, the unit can distinguish between a reflected signal which is smaller than expected due to a weaker radiation source 312 compared to one due to an out of focus object 322.

The signal output of the second detection unit 318 is passed to a signal reader (not shown), which also receives the signal output from the first detection unit 316. Alternatively, the second detection unit 318 may be directly connected to the first detection unit 316. One type of connection may be operative to add or take the ratio between the two output signals.

Figure 4:
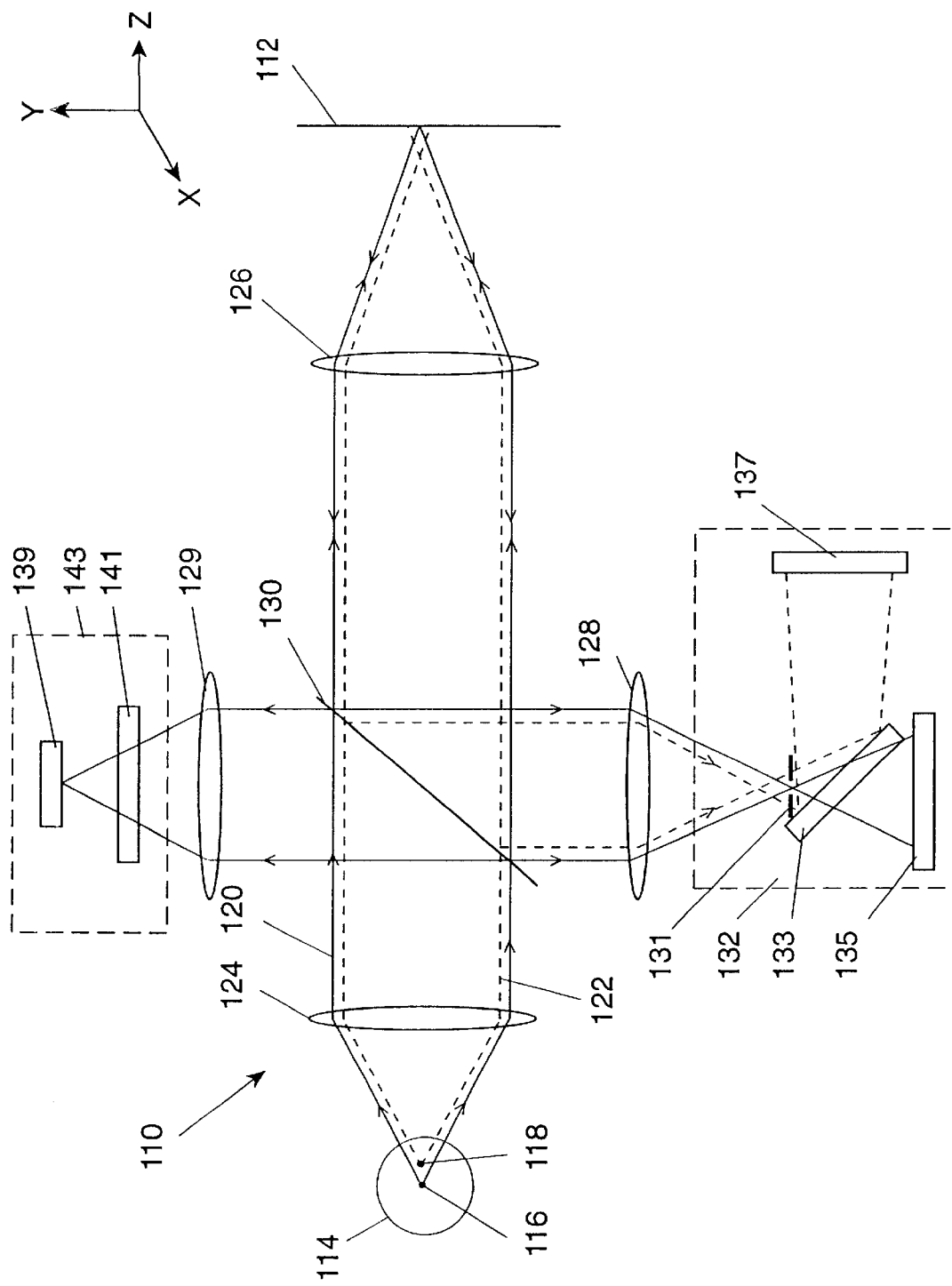
FIG. 4 is a high level schematic diagram illustrating an automatic focusing device constructed in accordance with a second embodiment of the present invention.

A high level schematic diagram illustrating an automatic focusing device, generally referenced 110, constructed in accordance with a second embodiment of the present invention is shown in FIG. 4. The automatic focusing device 110 comprises a radiation unit 114, which consists of a first and a second radiation source 116, 118, respectively. First and second radiation sources 116, 118 generate first and second light beams, referenced 120 (solid) and 122 (dashed), respectively. The first radiation source 116 emits light with a wavelength $\lambda_1$. The second radiation source 118 emits light with a wavelength $\lambda_2$. The spectral difference between $\lambda_1$ and $\lambda_2$ is chosen in accordance to the required dynamic range of the system and to the signal to noise ratio. The automatic focusing device also comprises a first detector unit 143 and a second detector unit 132.

For the purposes of example only and without limitation of the present invention, first and second light sources 116, 118 are shown as point sources in FIG. 4. As will be appreciated by persons skilled in the art, non point light sources may be used provided that the light sources are directed through an aperture.

For the purposes of the following description, the term 'illuminating' is not limited to the stationary illumination of an object, but also includes scanning of an object. The term 'reflection' refers to both specular and diffusive reflection and is not specifically limited to either or both of these types of reflection.

Light beams 120, 122 pass through optical element 124, beam splitter 130 and optical element 126 before reaching the target object 112. A portion of the light energy is reflected back through optical element 126 and is reflected by beam splitter 130 through optical element 128 to fall on second detector unit 132.

Likewise, a portion of the light from radiation source 116 is reflected by the beam splitter 130 through optical element 129 to fall on the first detection unit 143. The first detection unit 143 comprises a wavelength selecting filter 141 and a detector 139. Detector 139 receives light of wavelength $\lambda_1$ and functions to measure the magnitude of the light source 116.

The light beam with wavelength $\lambda_1$ is the light beam used for optically setting up the unit 110. The optimal focus position for the target object 112 is at a focal plane in which a maximum signal is detected by second detector unit 132. The second detector unit 132 comprises a confocal slit or aperture 131, beam splitter 133 sensitive to wavelength, and two detectors 135, 137. Beam splitter 133 is a spectral filter or dichroic mirror that splits the light beam into two beams each having a different wavelength. One light beam is transmitted to the first detector 135 and the second light beam is reflected to a second detector 137.

Once the target object 112 is in focus, first light beam 120, having a wavelength $\lambda_1$, is used to illuminate the target object 112 and the signal corresponding to the axial displacement is recorded by detector 135 within second detector unit 132.

The second light beam 122 having a wavelength $\lambda_2$ is also used to illuminate the target object 112. The light from radiation source 118 is reflected from the object 112 to beam splitter 130 and reflected through optical element 128 to second detection unit 132. The beam splitter 133 then steers the light beam to detector 137 which measures the intensity of the light corresponding to the axial displacement of the target object 112. Since the first and second light beams from radiation sources 116, 118 have different wavelengths, they focus on different planes.

Figure 5:
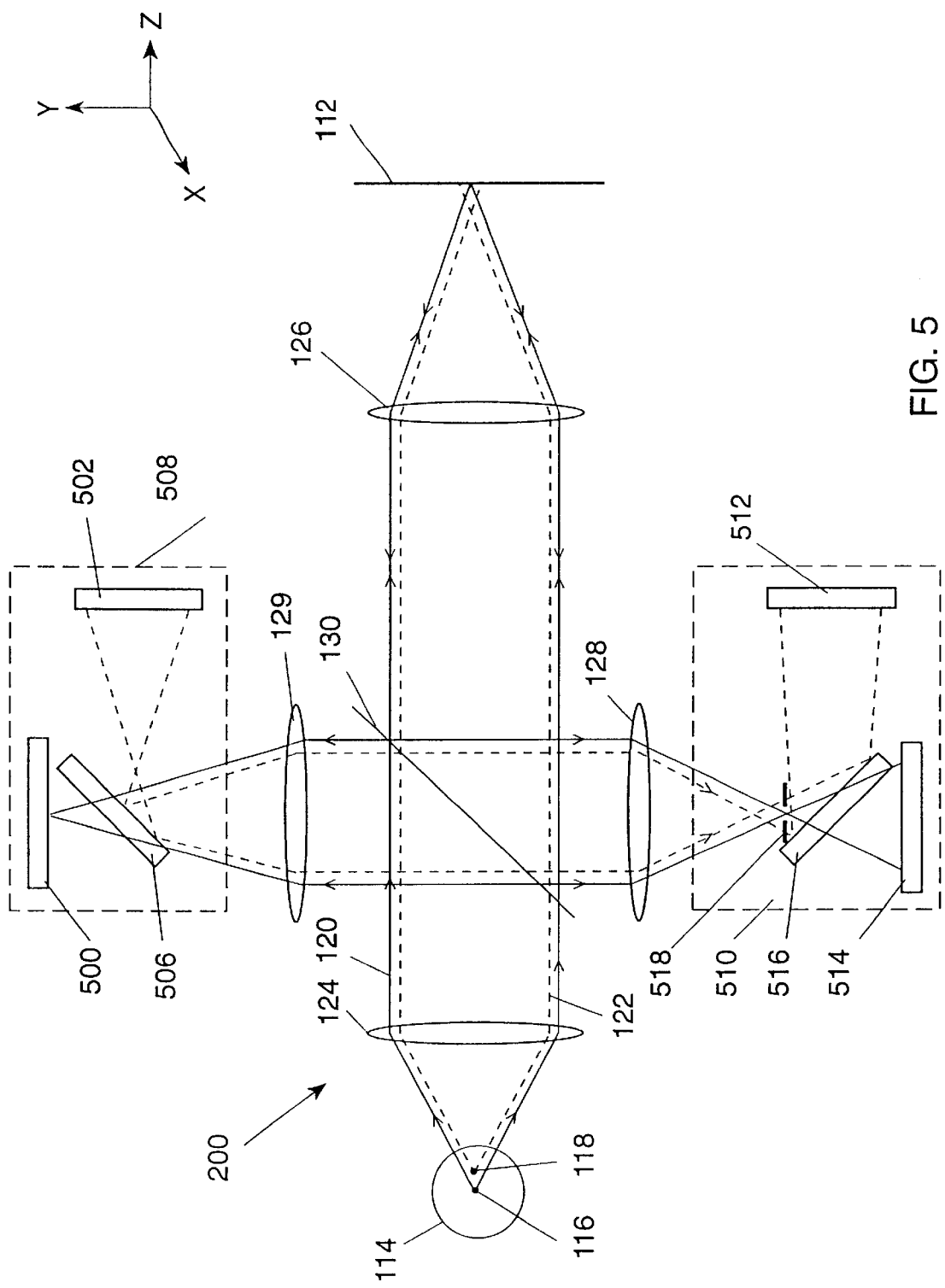
FIG. 5 is a high level schematic diagram illustrating an automatic focusing device constructed in accordance with a third embodiment of the present invention.

A high level schematic diagram illustrating an automatic focusing device, generally referenced 200, constructed in accordance with a third embodiment of the present invention is shown in FIG. 5. This third embodiment is very similar to that of FIG. 4, except for the second detection unit 508. Beam splitter 130 reflects light from first and second light sources 116, 118, respectively, to detection unit 508. The detection unit comprises a beam splitter 506 similar to the beam splitter 133 (FIG. 4) and two detectors 500, 502. Detector 500 receives light of wavelength $\lambda_1$ and functions to measure the magnitude of the light source 116. Similarly, detector 502 receives light of wavelength $\lambda_2$ and functions to measure the magnitude of the light source 118. These measurements are used to normalize the reflected light beams measured from the target object.

A first detection unit 510 measures the light reflected off the target object. The detection unit 510 comprises a beam splitter 516 similar to the beam splitter 506. In addition, the detection unit 510 also comprises two detectors 514, 512 and a confocal slit or aperture 518. The detector 514 functions to measure the light having a wavelength $\lambda_1$ reflected off the target object. Similarly, the detector 512 functions to measure the light having a wavelength $\lambda_2$ reflected off the target object.

Figure 6:
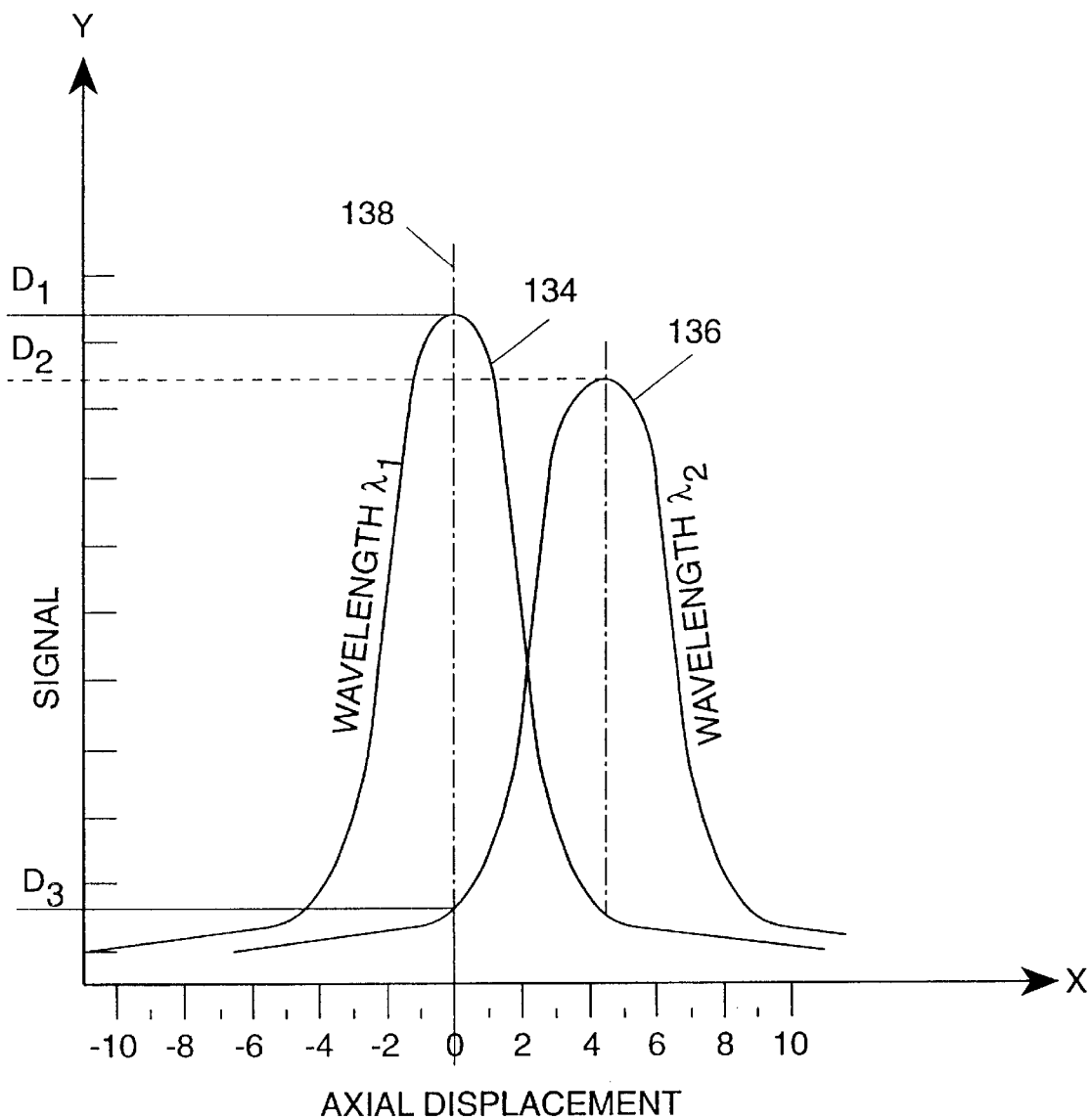
FIG. 6 graphically illustrates the peak signal strength as a function of the axial displacement between the optical assembly and the target object for two wavelengths of light using the automatic focusing device of the present invention.

A graph illustrating the peak signal strength as a function of the axial displacement between the optical assembly and the target object for two wavelengths of light using the automatic focusing device of the present invention is shown in FIG. 6. The signals detected by detector 514, 512 in detection unit 510 are utilized to determine and maintain the focal position as well as for calibrating the light source as described in detail below.

With reference to FIG. 6, signal 134 represents the signal reflected from the target object 112 for the light beam having a wavelength $\lambda_1$. During the setup mode of the device, the target object is swept through the entire focusing range of the device. The signal is recorded and the axial displacement giving a maximum signal from detector 514 is stored, as referenced by line 138. As shown in FIG. 6, the shape of the reflected signal 134 is substantially symmetrical about an axial displacement of zero. i.e., 0 $\mu$m, line 138. The magnitude of the maximum signal is indicated by horizontal line $D_1$.

Signal 136 represents the signal reflected from the target object 112 for the light beam having a wavelength $\lambda_2$ as it is scanned through the focusing range. The axial displacement corresponding to the maximum magnitude $D_2$ of signal 136 is offset from the displacement line 138. If wavelength $\lambda_2$ is larger than $\lambda_1$, the maximum signal magnitude $D_2$ will correspond to an axial displacement usually farther from the target object than $D_1$. The magnitude $D_3$ represents the magnitude of the light beam having wavelength $\lambda_2$ at an axial position equal to the maximum magnitude of signal 134, represented by line 138.

In order to maintain the target object 112 in focus, the automatic focusing device 200 continuously measures the signal, referred to as $D_4$, reflected off the object being illuminated. Using this signal the following entity is calculated $$\Delta D_2 = D_4 - D_3$$

The value $D_4$ is the magnitude of the light of wavelength $\lambda_2$ measured at detector 512 in detection unit 510 that was reflected off the object 112 (FIG. 5). The magnitude $\Delta D_2$ will be zero only when the object is in perfect focus. If $\Delta D_2$ is not equal to zero, the automatic focusing device 200 continuously adjusts the focusing distance in accordance with the magnitude and sign of $\Delta D_2$.

The advantage of using a second wavelength light is that the signal error measured by the detector 512 swings both positive and negative thus giving a definite indication of the direction of the misfocus. If the peak of the signal magnitude is detected and used to maintain focus, there is no indication of the direction of the misfocus since misfocus in both directions (i.e., closer or further) yields a lower magnitude than the maximum. A second light source is needed altogether because the first light source is typically modulated and thus does not illuminate the object continuously.

Figure 7A:
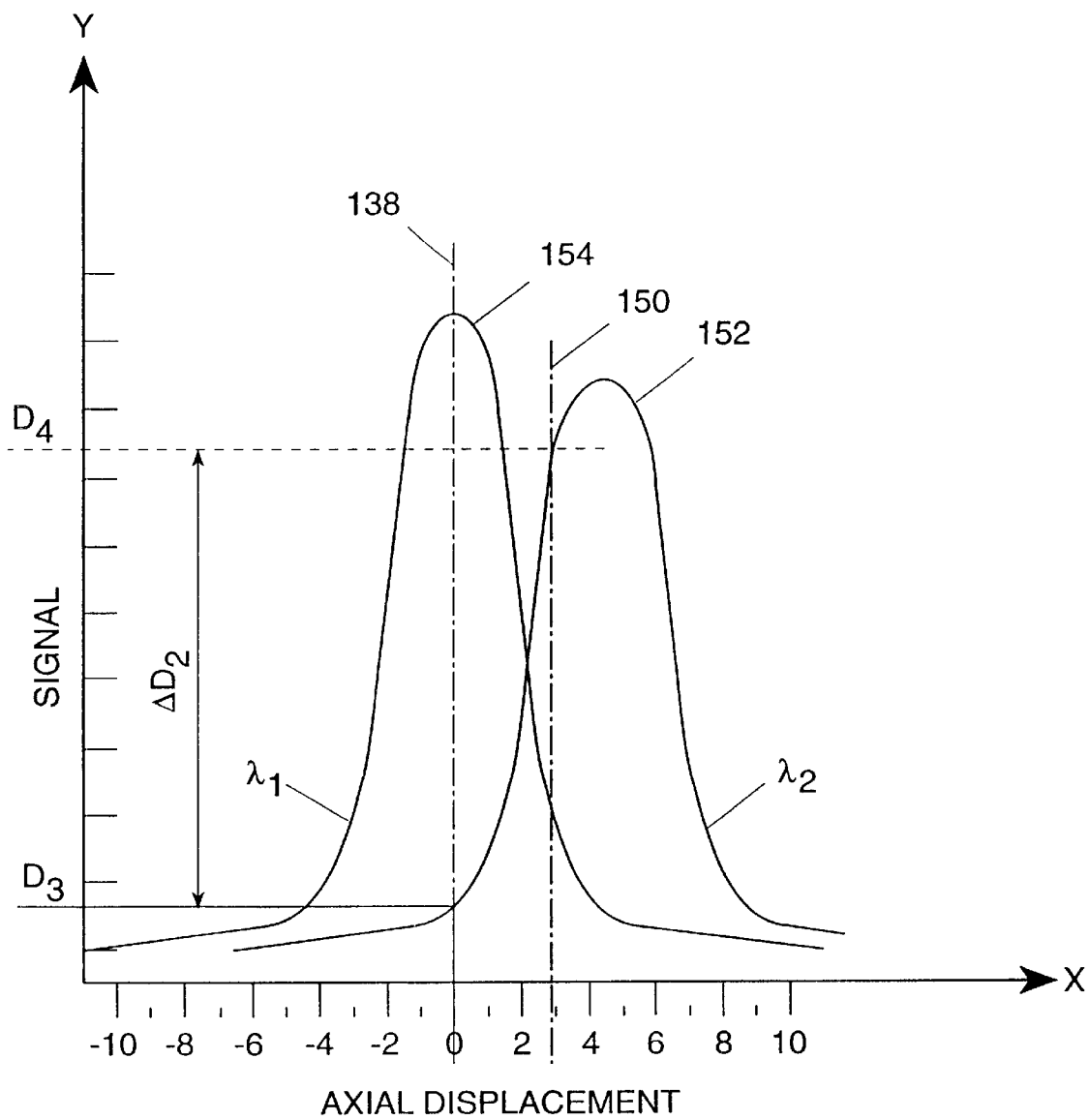
FIGS. 7A and 7B graphically illustrate signal strength as a function of the axial displacement for an object that is not in focus using the automatic focusing device of the present invention.
Figure 7B:
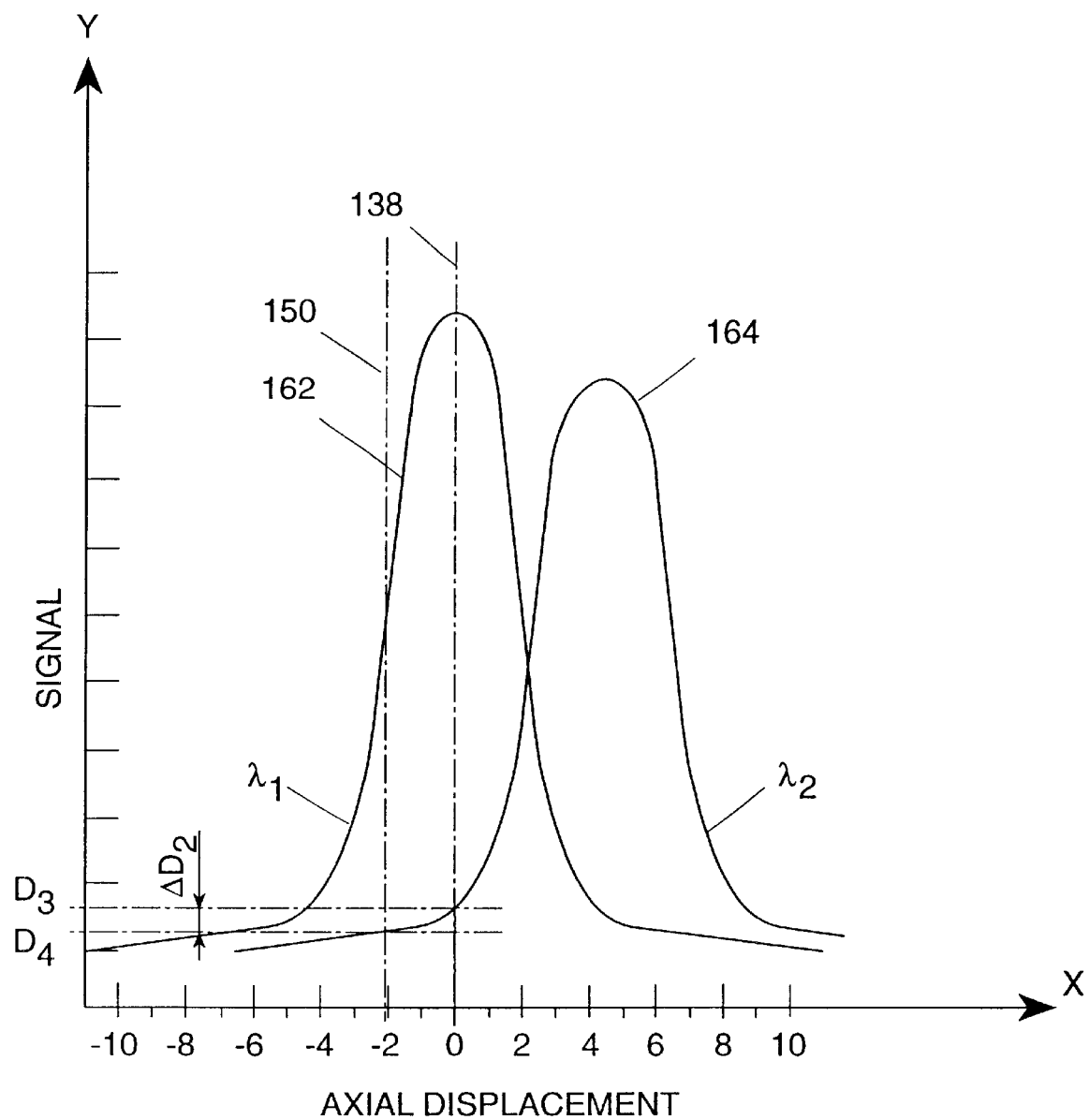

FIGS. 7A and 7B graphically illustrate signal strength as a function of the axial displacement for an object that is not in focus, using the automatic focusing device of the present invention.

FIG. 7A graphically illustrates an example when the object 112 is moved farther away from optical element 126 (FIG. 4) such that object 112 is out of focus with respect to the first light source (wavelength $\lambda_1$). The measured signal $D_4$ at position 150 is larger than $D_3$. The signal difference, being given by $$\Delta D_2 = D_4 - D_3$$

is a positive figure which indicates that the target object 112 is out of focus and further away from optical element 126.

In similar fashion, FIG. 7B graphically illustrates an example where the object 112 is moved closer to optical element 126 such that object 112 is not in focus. The measured signal $D_4$ at position 150 is now smaller than $D_3$. The signal difference, given by $$\Delta D_2 = D_4 - D_3$$

is negative, indicating that the target object 112 is out of focus and closer to the optical element 126.

Figure 8:
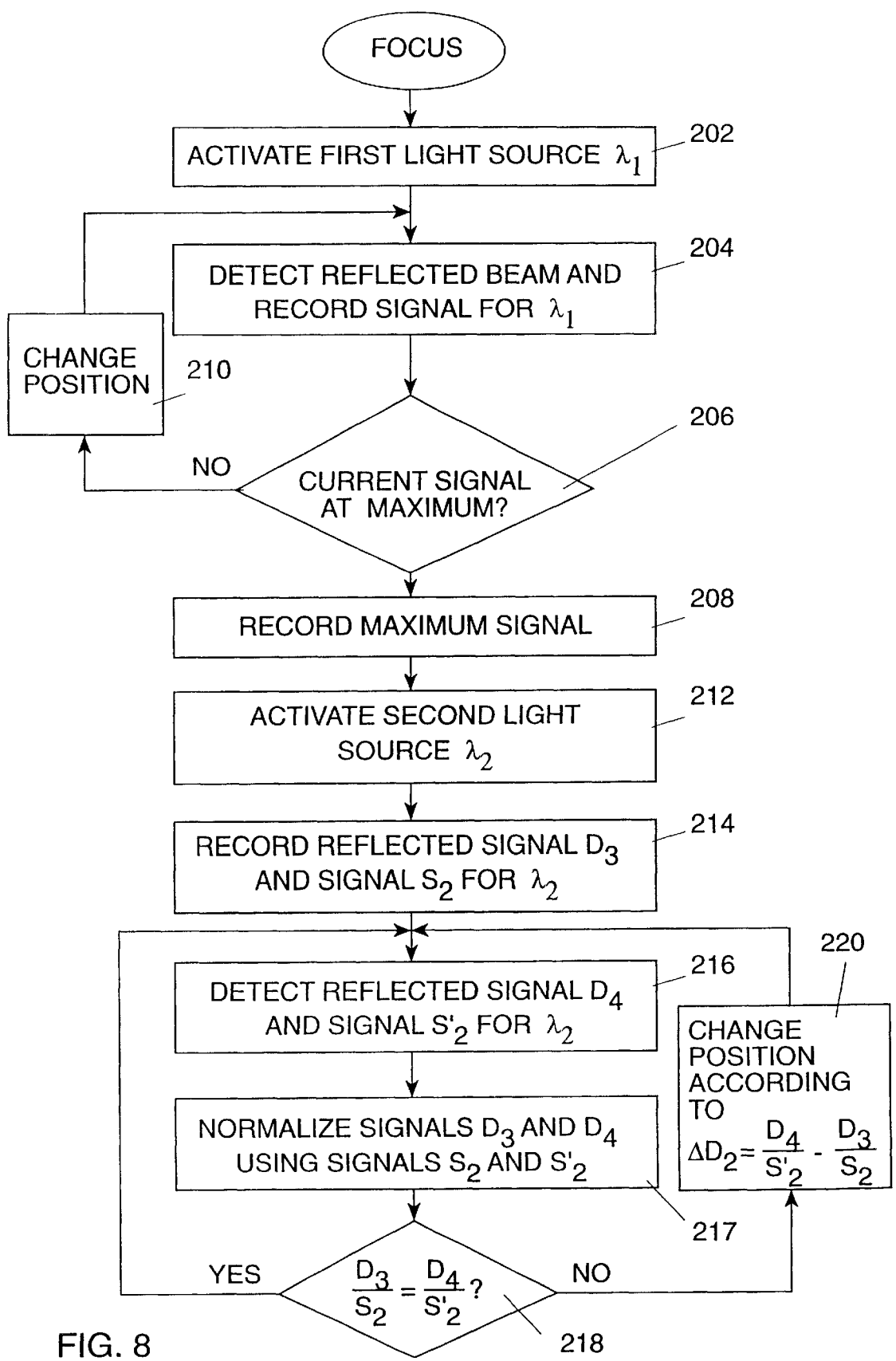
FIG. 8 is a high level flow diagram illustrating the automatic focusing method of the present invention.

A high level flow diagram illustrating the automatic focusing method of the present invention is shown in FIG. 8. Initially, the target object 112 to be illuminated is placed in position and the first light source 116 having a wavelength $\lambda_1$ is activated to illuminate the object 112 (step 202). The light is reflected off the object and projected onto detector 514 where it is measured (step 204). The measured signal is then compared with previous values of the signal in order to determine the maximum (i.e., signal $D_1$) (step 206). If a maximum signal has not been yet found, the focus distance is adjusted (step 210). A new measurement of the reflected light beam is made and this new measured signal is again checked to see if it is a maximum. Once a maximum is found, the signal is recorded (step 208). The maximum signal indicates that the target object is in focus.

Once initial focus is achieved the second light source 118 having a wavelength $\lambda_2$ is activated to illuminate the object 112 (step 212). The magnitude $D_3$ of the signal corresponding to the reflected light beam having a wavelength $\lambda_2$ is recorded while the target object 112 is in focus (i.e., $D_1$ is at its maximum) (step 214). Simultaneously, the magnitude of the signal source $S_2$ is also measured. This signal $S_2$ is used to normalize the measured signal $D_3$. It is this reference signal $D_3$ that is used to determine whether the target object is out of focus.

A loop is then begun, the first step of which is to measure the magnitude $D_4$ of the reflected light beam having wavelength $\lambda_2$. In addition, the magnitude of the signal source $S'_2$ is also measured which is used to normalize the measured signal $D_4$ (step 216). The measured signal D4 is then normalized using the magnitude of the light source $S'_2$, i.e., divided by $S'_2$ (step 217). The process of normalizing eliminates the effect of variations in the intensity of the light source. After normalization, the recorded reading $D_4$ is compared with the reference signal $D_3$ (step 218). Thus, during this step the following quantity is calculated $$\Delta D_2 = \frac{D_4}{S'_2} - \frac{D_3}{S_2}$$

If the readings are not identical, then the target object is not in focus. Based on the sign of $\Delta D_2$ the focus distance is either increased or decreased (step 220). A larger signal indicates that the object is further away (and vice-versa), thus the object can be moved in the correct direction in accordance with $\Delta D_2$. The loop repeats until the target object distance is adjusted so that normalized $D_3$ equals normalized $D_4$ (step 220).

Alternatively, if the axial displacement corresponding to the maximum $D_1$ and $D_2$ is known in advance, e.g., by theoretical analysis of the optical system, previous measurement, or any other means, one can bring the object 112 into focus without the use of $\lambda_1$. This is achieved by first looking for the maximum value $D_2$ of source $\lambda_2$. Then, the object 112 is moved by the corresponding known axial displacement and the values of $S_2$ and $D_3$ are read. A loop is then setup and run to keep $$\frac{D_3}{S_2}$$

constant in the manner previously described.

Figure 9:
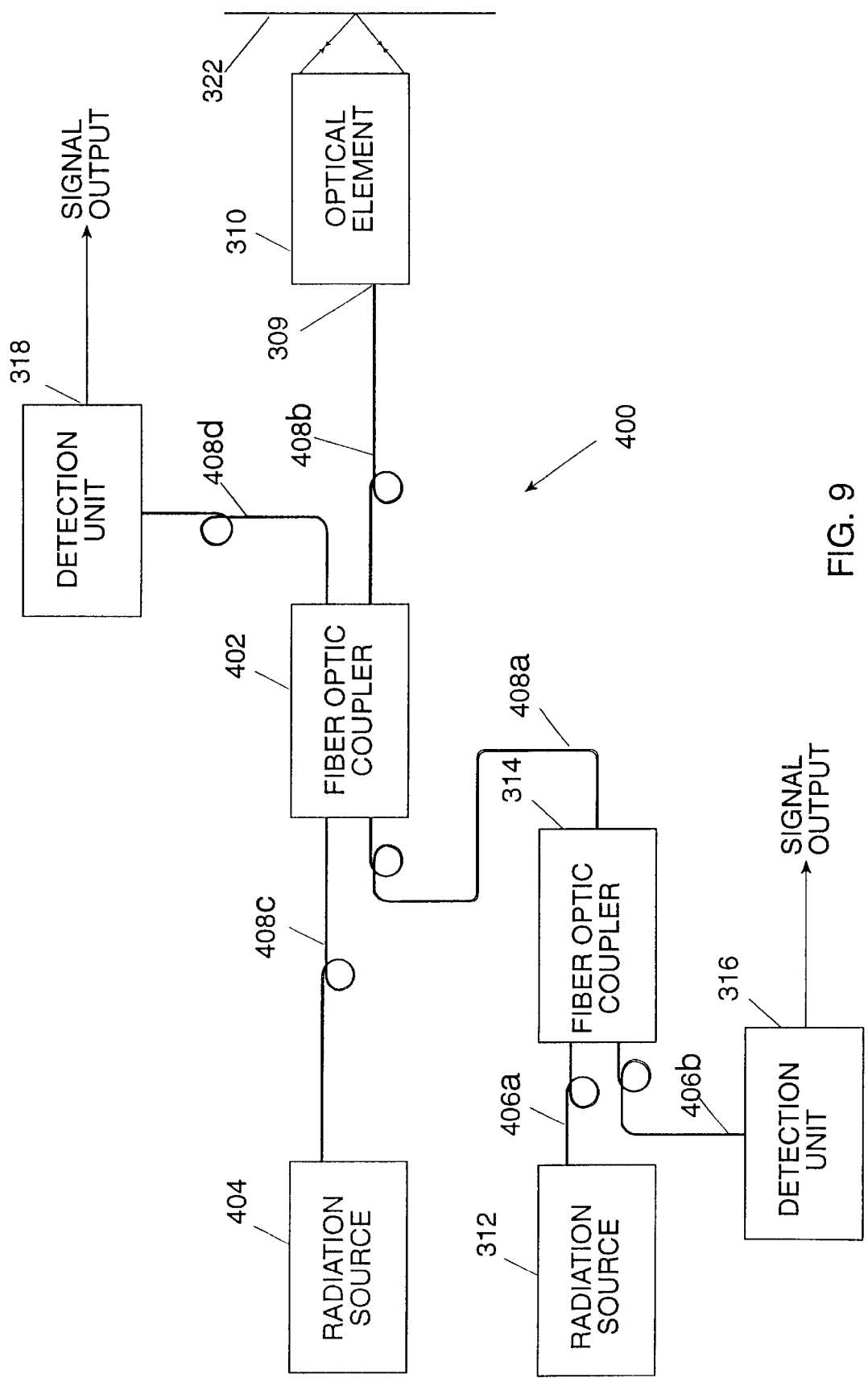
FIG. 9 is a high level block diagram illustrating an automatic focusing device constructed in accordance with a fourth embodiment of the present invention.

A high level block diagram illustrating an automatic focusing device, generally referenced 400, constructed in accordance with a fourth embodiment of the present invention is shown in FIG. 9. Automatic focusing device 400 comprises elements similar to those of the device of FIG. 3. In particular, automatic focusing device 400 comprises a first radiation source 312, a second radiation source 404, a first fiber optic coupler 314, a second fiber optic coupler 402 and an optical element 310. In addition, the device comprises a first detection unit 316 and a second detection unit 318. The first fiber optic coupler 314 is connected to first radiation source 312 via optical fiber 406a, to first detection unit 316 via optical fiber 406b and to second detection unit 318 via optical fiber 408a, second fiber optic coupler 402 and optical fiber 408d.

Second fiber optic coupler 402 is connected to the optical system 310 via optical fiber 408b, to a second radiation source 404 via optical fiber 408c, to first fiber optic coupler 314 via optical fiber 408a and to second detection unit 318 via optical fiber 408d.

During operation of the automatic focusing device 400, the light beam from light source 312, i.e., wavelength $\lambda_1$, is used for initializing the unit and the light beam from light source 404, i.e., wavelength $\lambda_2$, is used for maintaining the target object in focus. The method of setting up the automatic focus device 400 and of maintaining the target object in focus is similar to the method previously described with respect to FIG. 8.

To set up the automatic focus device 400, the target object 322 to be illuminated is placed in position and a light beam having a wavelength $\lambda_1$ is activated from radiation source 312. The beam is directed via optical fiber 406a, first fiber optic coupler 314, optical fiber 408a, second fiber optic coupler 402 and optical fiber 408b to optical element 310 to illuminate the target object 322. Light reflected off the object returns along optical fiber 408b, through second and first fiber optic couplers 402, 314 and via optical fiber 406b to first detection unit 316. The detected signal, which corresponds to the axial displacement, is measured and recorded. The focus distance to the target object 322 is repeatedly adjusted until a maximum signal $D_1$ is recorded. Achieving a maximum signal $D_1$ indicates that the target object is in focus.

Once the target object 322 is placed in focused, it is maintained in focus by measuring the reflected light from a second light source 404, having a wavelength $\lambda_2$. The initial reflected signal $D_3$ for the second light source is then recorded while the target object is in focus. This value $D_3$ corresponds to the maximum signal for wavelength $\lambda_1$ indicating that the target object is in focus. Light having wavelength $\lambda_2$ travels via fiber 408c, second fiber optic coupler 402 and fiber 408b to optical element 310. The reflected signal returns via fiber 408b, second and first fiber optic couplers 402, 314 and optical fiber 406b to first detection unit 316.

The light beam having a wavelength $\lambda_2$ emitted from the second radiation source 404 is also detected by second detection unit 318 in a manner similar to that previously described with respect to second radiation source 118 (FIG. 5).

As previously described, the second light source 404, having wavelength $\lambda_2$, continuously illuminates the target object 322. The magnitude $D_4$ of the reflected light beam having a wavelength $\lambda_2$ is recorded and compared with the initial signal $D_3$ previously recorded. Concurrently, detection unit 318 monitors the intensity of the signal $S_2$ from second light source 404 for normalization purposes. The value $S_2$ is used to normalize the values $D_3$, $D_4$ so as to eliminate the effect of varying intensity output of the radiation sources 312, 404.

Figure 10A:
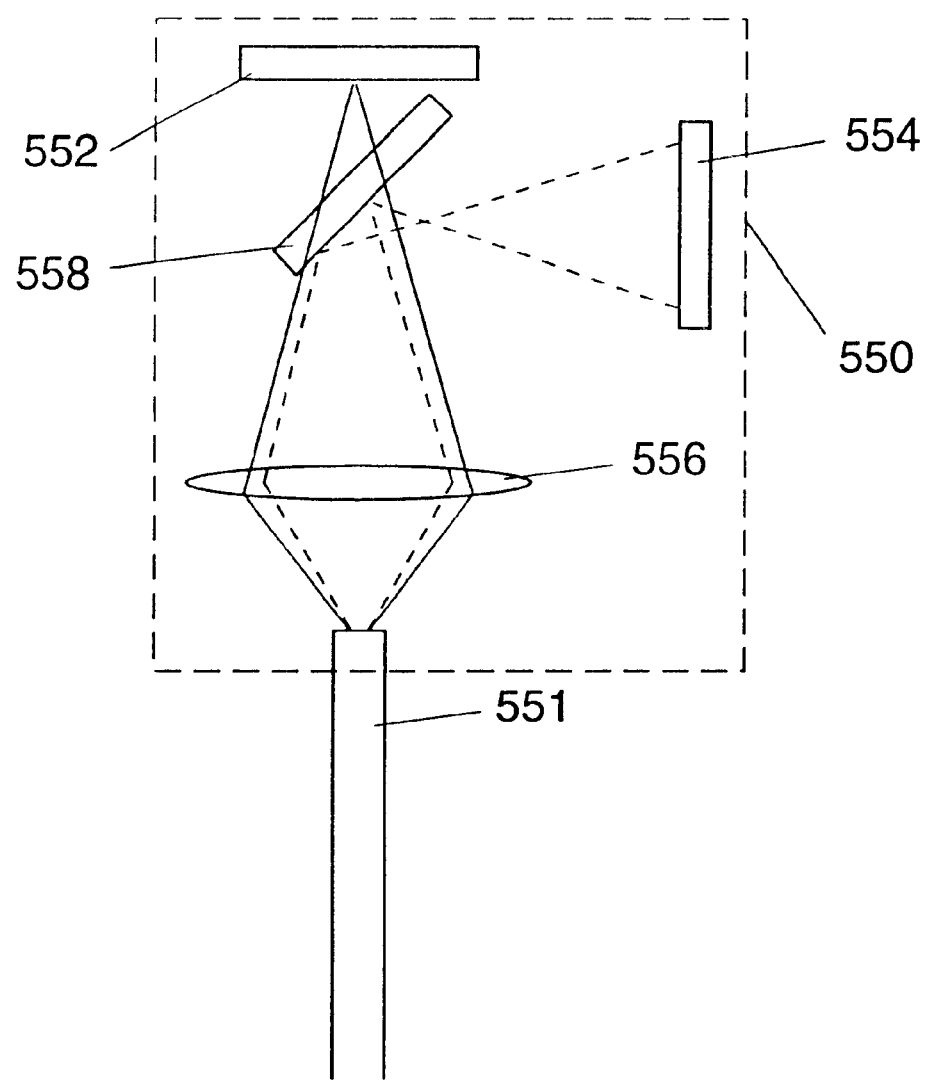
FIG. 10A is a high level schematic illustrating a first and second detection unit of the automatic focusing device having a beam splitter and two detectors.

A high level schematic illustrating a first and second detection unit of the automatic focusing device having a beam splitter and two detectors is shown in FIG. 10A. The detection unit 550 can be used for the detection units 316, 318 (FIG. 9) in the event the intensities of the first and second radiation sources 312, 404 are to be measured for normalization or other purposes. A fiber optic cable 551 is terminated so as to project light onto optical element 556. The light from the optical element is projected onto beam splitter 558. The beam splitter projects light from the first radiation source onto detector 552 and light from the second radiation source onto detector 554.

Figure 10B:
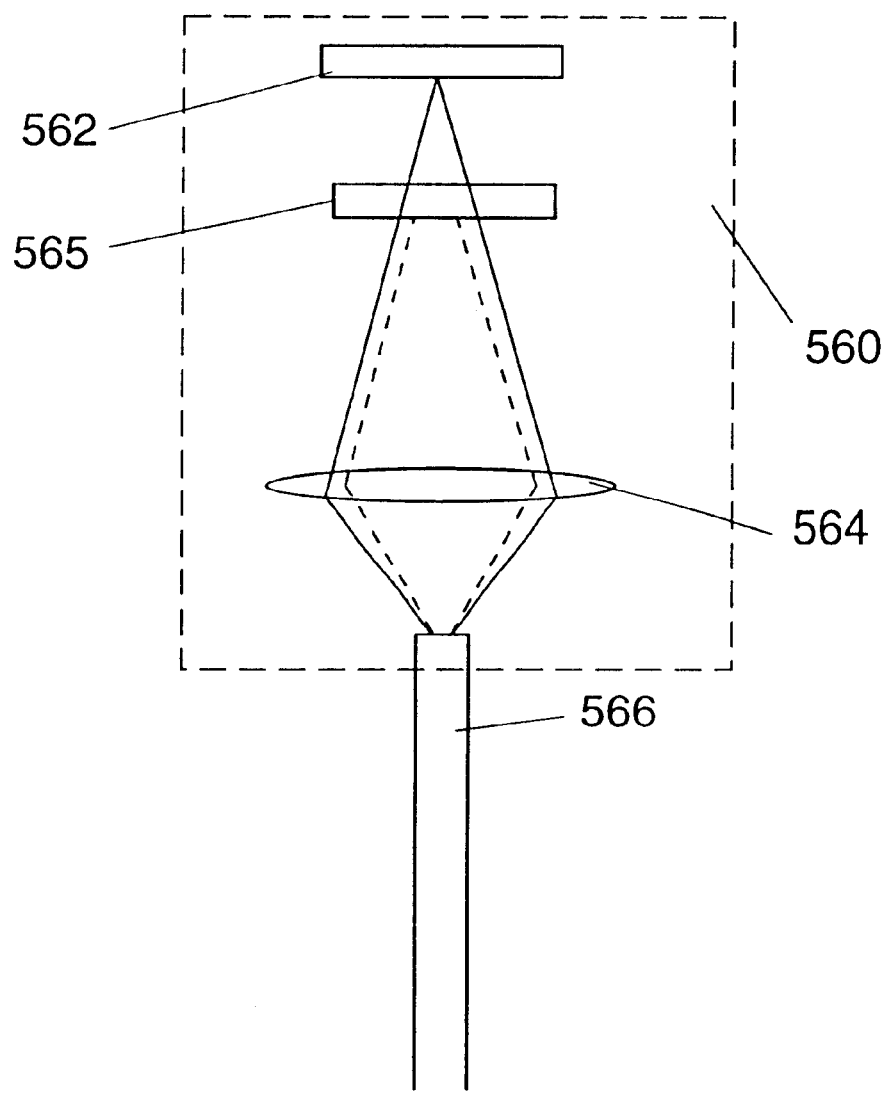
FIG. 10B is a high level schematic illustrating a second detection unit of the automatic focusing device having a wavelength selecting filter and one detector.

In the alternative, only reflected light from the first radiation light source may be detected. A high level schematic illustrating a second detection unit 560 of the automatic focusing device having a wavelength selecting filter and one detector is shown in FIG. 10B. The light from fiber optic cable 566 is projected through optical element 564 onto detector 562 via wavelength selecting filter 565.

It will be appreciated by persons skilled in the art that the automatic focusing device of the present invention may be used with or without fiber optic couplers and beam splitters and that the present invention may also use a combination of beam splitters and fiber optic couplers in accordance with any particular requirements.

It will be further appreciated by persons skilled in the art that the automatic focus device of the present invention is not limited to moving and scanning the target object but that the optical head or a portion thereof may be scanned or moved relative to the target object in the alternative.

The optical systems of FIGS. 4, 5, 9 also have application in performing a diagnostic function. In many cases it is desirable to be able to detect degradation of an optical system. A diagnostic method of the present invention can be utilized to detect when the optical system has degraded beyond a predetermined threshold. The method first takes a reference reading of the optical system at some point in time, typically when the unit is first installed. At periodic times thereafter, readings are taken and compared to the reference readings taken earlier. If the current readings are beyond a certain threshold, a problem is indicated.

Figure 11:
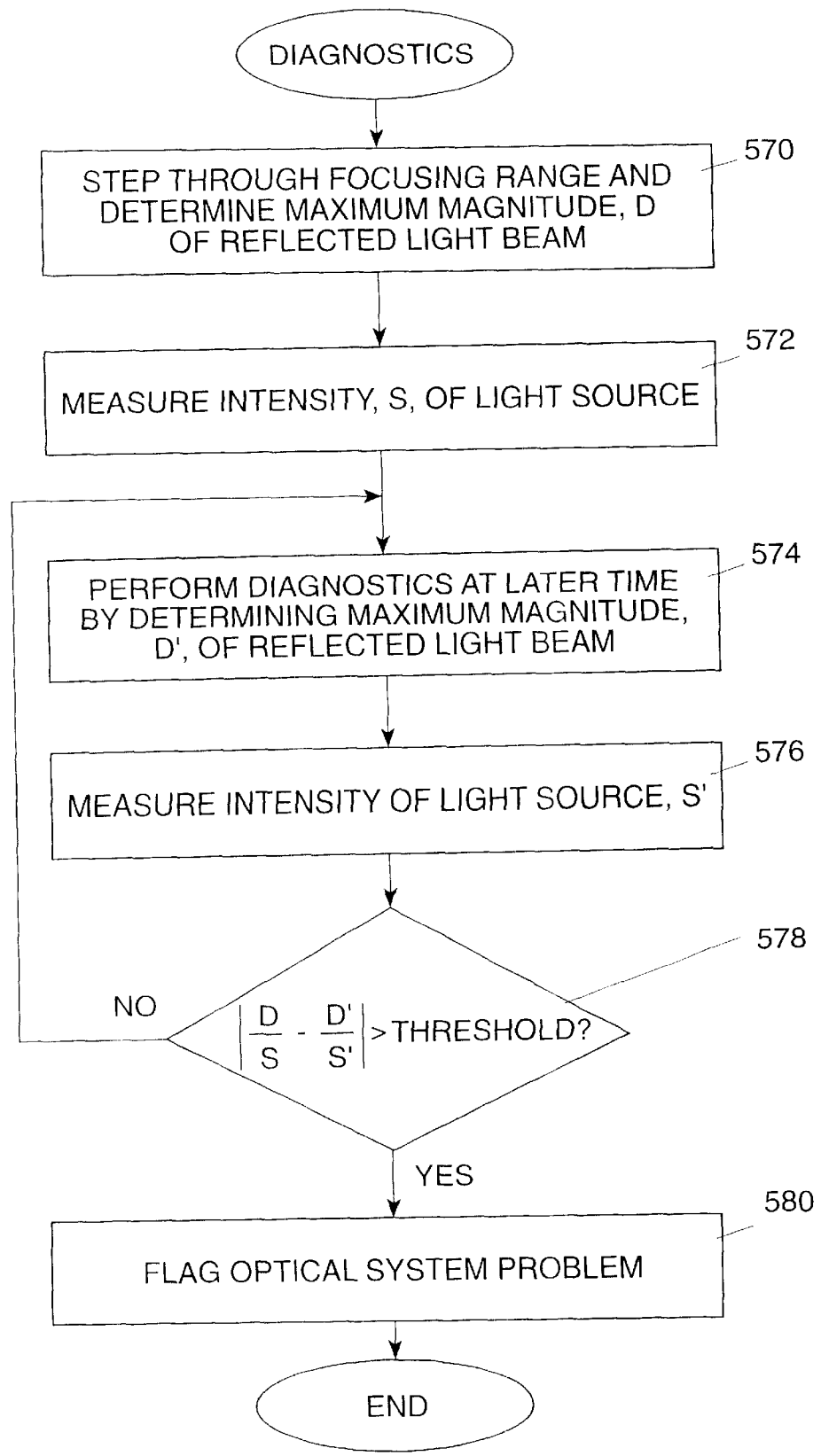
FIG. 11 is a high level flow diagram illustrating the diagnostic method of a fifth embodiment of the present invention.

The diagnostic method will now be described in more detail. A high level flow diagram illustrating the diagnostic method of a fifth embodiment of the present invention is shown in FIG. 11. For illustrative purposes only the method will be described with reference to the optical system of FIG. 5. This in no way limits the method of the present invention to the optical system of FIGS. 4 and 9 or to other optical systems.

The method described below can be performed using light from either radiation source (i.e., wavelength $\lambda_1$ or $\lambda_2$). Alternatively, the method can be used with both radiation sources to provide two diagnostic checks rather than one.

With reference to FIG. 5, assume the method is performed using light from the first light source having wavelength $\lambda_1$. At some arbitrary point in time after the optical system is installed and operating properly, a set of reference readings are made (step 570). The entire focusing range is swept through while the magnitude of the reflected light beam is measured at detector 514. The maximum magnitude D of reflected light is determined. At substantially the same time, the signal strength S of the first light source is also measured at detector 500 (step 572).

Some time later, a diagnostic check is then performed. The first step is to step through the focusing range of the device and determine the maximum magnitude D' of the reflected light (step 574). At substantially the same time, the magnitude S' of the first light source is measured (step 576). The following comparison is then made (step 578).

$$\left| \frac{D}{S} - \frac{D'}{S'} \right| > \text{THRESHOLD}$$

The ratio of the maximum reflected signal to the intensity of the light source for the reference or initial readings is compared to the ratio just measured. If the absolute value of the difference exceeds a predetermined threshold, a problem in the optical system is indicated (step 580).

Similarly, a diagnostic check can be performed using light having wavelength $\lambda_2$. In this case, detector 512 (FIG. 5) is used to measure the reflected light from the target object and detector 502 is used to measure the intensity of the light source.

It will be appreciated by persons skilled in the art that the present invention is not limited to what has been particularly shown and described hereinabove. Rather the scope of the present invention is defined only by the claims which follow.

What is claimed is:

1. In an automatic focus system having a first light source of a first wavelength, a second light source of a second wavelength, a method of achieving optical focus distance for a target object, said method comprising the steps of:

illuminating the target object with said first light source;

stepping through a focusing range for said focus system;

determining the maximum signal of a light beam of said first wavelength reflected off the target object for the entire focusing range, said maximum signal representing optical focal distance for the target object;

illuminating the target object when at a focal distance corresponding to said optical focal distance with said second light source;

measuring a signal $D_3$ of a light beam of said second wavelength reflected off the target object, said signal $D_3$ representing optical focal distance for the target object;

measuring, on a substantially continuous basis, a signal $D_4$ of a light beam of said second wavelength reflected off the target object;

calculating the difference $\Delta D_2 = D_4 - D_3$; and adjusting the focal distance to the target object in accordance with the sign and magnitude of $\Delta D_2$.

2. The method according to claim 1, further comprising the steps of:

measuring a signal $S_2$ corresponding to the intensity of said second light source; and normalizing said signals $D_4$ and $D_3$ utilizing said signal $S_2$ before said step of calculating.

3. In an optical system for illuminating a target object with a light source, a method for performing diagnostics on said optical system, said method comprising the steps of:

stepping through a focusing range for said optical system;

determining a maximum magnitude D of the light reflected off the target object for the entire focusing range;

measuring the intensity S of the light source;

at a later time:

stepping through a focusing range for said optical system;

determining a maximum magnitude D' of the light reflected off the target object for the entire focusing range;

measuring the intensity S' of the light source;

calculating the quantity $$\left| \frac{D}{S} - \frac{D'}{S'} \right|;$$

and indicating to said system that a problem exists if said quantity exceeds a predetermined threshold.

* * * * *